United States Patent
Torii et al.

(10) Patent No.: US 10,336,188 B2
(45) Date of Patent: Jul. 2, 2019

(54) VEHICLE DISPLAY SYSTEM AND METHOD OF CONTROLLING VEHICLE DISPLAY SYSTEM

(71) Applicant: SUBARU CORPORATION, Tokyo (JP)

(72) Inventors: Takeshi Torii, Tokyo (JP); Noeru Sato, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/898,254

(22) Filed: Feb. 16, 2018

(65) Prior Publication Data

US 2018/0264940 A1 Sep. 20, 2018

(30) Foreign Application Priority Data

Mar. 15, 2017 (JP) .................................. 2017-050342

(51) Int. Cl.
*B60Q 1/50* (2006.01)
*B60Q 1/52* (2006.01)
(Continued)

(52) U.S. Cl.
CPC .............. *B60K 28/02* (2013.01); *B60K 35/00* (2013.01); *B60Q 1/50* (2013.01); *G02B 27/0093* (2013.01);
(Continued)

(58) Field of Classification Search
None
See application file for complete search history.

(56) References Cited

U.S. PATENT DOCUMENTS 5,386,247 A * 1/1995 Shafer ................ H04N 5/44513
　　　　　　　　　　　　　　　　　　　　348/563
6,163,336 A * 12/2000 Richards ............ G02B 27/0093
　　　　　　　　　　　　　　　　　　　　348/42

(Continued)

FOREIGN PATENT DOCUMENTS

CN　　101860702 A　　10/2010
CN　　101889299 A　　11/2010
(Continued)

OTHER PUBLICATIONS

Y. Maruyama et al., "Introduction of Driver Monitoring System," Oki Technical Review, Issue 220, vol. 79, No. 2, Nov. 2012, pp. 16-19, with English translation.

(Continued)

*Primary Examiner* — Steven Lim
*Assistant Examiner* — Muhammad Adnan
(74) *Attorney, Agent, or Firm* — McDermott Will & Emery LLP

(57) ABSTRACT

A vehicle display system includes a display device, a driver state determiner, and a display controller. The display device is configured to provide a display on a window of a vehicle. The driver state determiner is configured to determine whether a driver of the vehicle is in a normal state. The display controller is configured to control displaying of the display device, depending on whether the driver is in the normal state. The display controller is configured to control the displaying of the display device to provide a display for the driver when the driver is determined by the driver state determiner as being in the normal state, and to provide a display for an outside of the vehicle when the driver is determined by the driver state determiner as not being in the normal state.

13 Claims, 8 Drawing Sheets

(51) Int. Cl.
  *B60Q 9/00* (2006.01)
  *G08G 1/16* (2006.01)
  *G02B 27/00* (2006.01)
  *G02B 27/01* (2006.01)
  *B60Q 1/26* (2006.01)
  *B60K 28/02* (2006.01)
  *B60K 35/00* (2006.01)

(52) U.S. Cl.
  CPC ......... *G02B 27/0101* (2013.01); *G08G 1/166* (2013.01); *B60K 2350/1096* (2013.01); *B60K 2350/962* (2013.01); *B60K 2350/965* (2013.01); *B60Q 1/268* (2013.01); *B60Q 1/525* (2013.01); *B60Q 9/008* (2013.01); *B60R 2300/107* (2013.01); *B60R 2300/205* (2013.01); *G02B 2027/014* (2013.01); *G02B 2027/0138* (2013.01); *G02B 2027/0141* (2013.01)

(56) References Cited

U.S. PATENT DOCUMENTS

| | | | | |
|---|---|---|---|---|
| 7,092,015 | B1* | 8/2006 | Sogawa | G01C 3/08 348/222.1 |
| 7,847,705 | B2* | 12/2010 | Kido | B60K 35/00 340/815.4 |
| 8,031,085 | B1* | 10/2011 | Anderson | B60Q 5/008 340/425.5 |
| 8,571,743 | B1* | 10/2013 | Cullinane | G05D 1/00 701/23 |
| 8,761,991 | B1* | 6/2014 | Ferguson | G05D 1/0088 340/917 |
| 8,868,293 | B2* | 10/2014 | Mori | B60K 37/06 701/36 |
| 9,405,006 | B2* | 8/2016 | Ouchi | G08G 1/165 |
| 9,511,730 | B1 | 12/2016 | Wu | |
| 9,769,616 | B1* | 9/2017 | Pao | H04W 4/023 |
| 9,953,538 | B1* | 4/2018 | Matthiesen | G08G 1/166 |
| 2002/0036617 | A1* | 3/2002 | Pryor | G06F 3/042 345/156 |
| 2004/0178894 | A1* | 9/2004 | Janssen | B60K 35/00 340/435 |
| 2008/0106908 | A1* | 5/2008 | Englander | B60Q 1/24 362/481 |
| 2010/0253489 | A1 | 10/2010 | Cui et al. | |
| 2010/0253492 | A1* | 10/2010 | Seder | G01S 13/723 340/435 |
| 2010/0253493 | A1 | 10/2010 | Szczerba et al. | |
| 2010/0253494 | A1 | 10/2010 | Inoue | |
| 2010/0253526 | A1 | 10/2010 | Szczerba et al. | |
| 2010/0253539 | A1 | 10/2010 | Seder et al. | |
| 2010/0253540 | A1 | 10/2010 | Seder et al. | |
| 2010/0253541 | A1 | 10/2010 | Seder et al. | |
| 2010/0253542 | A1 | 10/2010 | Seder et al. | |
| 2010/0253543 | A1 | 10/2010 | Szczerba et al. | |
| 2010/0253593 | A1 | 10/2010 | Seder et al. | |
| 2010/0253594 | A1 | 10/2010 | Szczerba et al. | |
| 2010/0253595 | A1 | 10/2010 | Szczerba et al. | |
| 2010/0253596 | A1 | 10/2010 | Szczerba et al. | |
| 2010/0253597 | A1 | 10/2010 | Seder et al. | |
| 2010/0253598 | A1 | 10/2010 | Szczerba et al. | |
| 2010/0253599 | A1 | 10/2010 | Szczerba et al. | |
| 2010/0253600 | A1 | 10/2010 | Seder et al. | |
| 2010/0253601 | A1 | 10/2010 | Seder et al. | |
| 2010/0253602 | A1 | 10/2010 | Szczerba et al. | |
| 2010/0253688 | A1 | 10/2010 | Cui et al. | |
| 2010/0253918 | A1 | 10/2010 | Seder et al. | |
| 2010/0254019 | A1 | 10/2010 | Cui et al. | |
| 2013/0030645 | A1* | 1/2013 | Divine | B60K 35/00 701/36 |
| 2013/0135092 | A1* | 5/2013 | Wu | B60K 28/066 340/439 |
| 2014/0091989 | A1 | 4/2014 | Szczerba et al. | |
| 2014/0114502 | A1* | 4/2014 | Hugron | B60W 50/14 701/2 |
| 2015/0228195 | A1* | 8/2015 | Beaurepaire | G08G 1/0962 340/907 |
| 2015/0336502 | A1* | 11/2015 | Hillis | B60Q 1/26 701/23 |
| 2016/0042238 | A1* | 2/2016 | Lynam | B60Q 9/005 701/45 |
| 2016/0082840 | A1 | 3/2016 | Yoshida et al. | |
| 2016/0236612 | A1 | 8/2016 | Caron | |
| 2017/0210285 | A1* | 7/2017 | Kobayashi | B60Q 1/50 |

FOREIGN PATENT DOCUMENTS

| | | |
|---|---|---|
| CN | 105163972 A | 12/2015 |
| CN | 105612083 A | 5/2016 |
| JP | 2010-113601 A | 5/2010 |
| JP | 2010-217956 A | 9/2010 |
| JP | 2012-171474 A | 9/2012 |
| JP | 2013-114668 A | 6/2013 |
| JP | 2016-038866 A | 3/2016 |
| JP | 2016-053821 A | 4/2016 |
| KR | 2016-0112213 A | 9/2016 |

OTHER PUBLICATIONS

Japanese Office Action issued in corresponding Japanese Patent Application No. 2017-050342, dated Sep. 11, 2018, with English Translation.

Chinese Office Action issued in corresponding Chinese Patent Application No. 201810139510.5, dated Apr. 3, 2019, with English Translation.

* cited by examiner

VEHICLE DISPLAY SYSTEM AND METHOD OF CONTROLLING VEHICLE DISPLAY SYSTEM

CROSS-REFERENCE TO RELATED APPLICATIONS

The present application claims priority from Japanese Patent Application No. 2017-050342 filed on Mar. 15, 2017, the entire contents of which are hereby incorporated by reference.

BACKGROUND

The technology relates to a vehicle display system and a method of controlling the vehicle display system.

Japanese Unexamined Patent Application Publication (JP-A) No. 2013-114668 discloses a technique in which running data on a vehicle is analyzed and then a safe driving signal is generated to indicate which of safe driving, driving with fatigue, careless driving, and drunk driving corresponds to a driver's driving operation. This safe driving signal is displayed for the driver, thereby allowing the driver to assess a current state of his/her own driving operation.

Nowadays, a technique in which a state of a person is recognized on the basis of image information on his/her face is commonly used. As an example, Yuto Maruyama and Atsuko Matsuoka, "Introduction of Driver Monitoring System." Oki Technical Review, issue 220, volume 79, no. 2, November 2012, discloses a technique in which a state of a driver of a vehicle is monitored through facial recognition while the vehicle is running.

SUMMARY

An aspect of the technology provides a vehicle display system that includes: a display device configured to provide a display on a window of a vehicle; a driver state determiner configured to determine whether a driver of the vehicle is in a normal state; and a display controller configured to control displaying of the display device, depending on whether the driver is in the normal state. The display controller is configured to control the displaying of the display device to provide a display for the driver when the driver is determined by the driver state determiner as being in the normal state, and to provide a display for an outside of the vehicle when the driver is determined by the driver state determiner as not being in the normal state.

An aspect of the technology provides a method of controlling a vehicle display system. The method includes: determining whether a driver of a vehicle is in a normal state, in which the vehicle includes a display device that provides a display on a window of the vehicle; and controlling displaying of the display device, depending on whether the driver is in the normal state, to provide a display for the driver when the driver is determined as being in the normal state and to provide a display for an outside of the vehicle when the driver is determined as not being in the normal state.

An aspect of the technology provides a vehicle display system that includes: a display device configured to provide a display on a window of a vehicle; a driver state determiner configured to determine a state of a driver of the vehicle; a determiner configured to determine a state of a person present outside the vehicle; and a display controller configured to control displaying of the display device to switch between a display for an inside of the vehicle and a display for an outside of the vehicle, depending on the state of the driver determined by the driver state determiner and the state of the person present outside the vehicle determined by the determiner.

An aspect of the technology provides a method of controlling a vehicle display system. The method includes: determining a state of a driver of a vehicle, in which the vehicle includes a display device that provides a display on a window of the vehicle; determining a state of a person present outside the vehicle; and controlling displaying of the display device to switch between a display for an inside of the vehicle and a display for an outside of the vehicle, depending on the determined state of the driver and the determined state of the person present outside the vehicle.

An aspect of the technology provides a vehicle display system that includes: a display device configured to provide a display on a window of a vehicle; and circuitry configured to determine whether a driver of the vehicle is in a normal state, control displaying of the display device to provide a display for the driver when the driver is determined as being in the normal state, and control the displaying of the display device to provide a display for an outside of the vehicle when the driver is determined as not being in the normal state.

An aspect of the technology provides a vehicle display system that includes: a display device configured to provide a display on a window of a vehicle; and circuitry configured to determine a state of a driver of the vehicle; determine a state of a person present outside the vehicle; and control displaying of the display device to switch between a display for an inside of the vehicle and a display for an outside of the vehicle, depending on the determined state of the driver and the determined state of the person present outside the vehicle.

DETAILED DESCRIPTION

Figure 1:
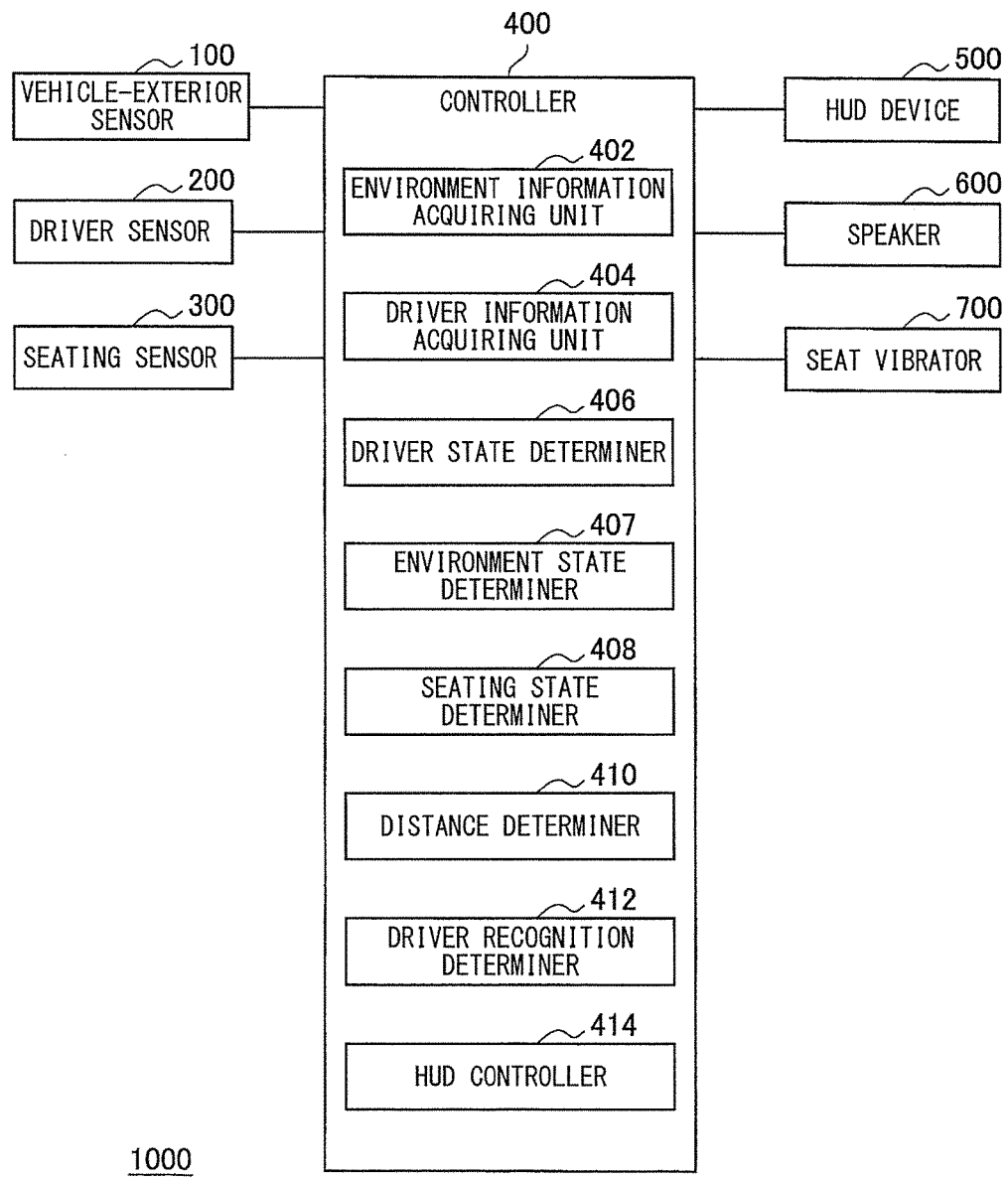
FIG. 1 schematically illustrates an example of a configuration of a vehicle display system according to one implementation of the technology.

In a technique disclosed in JP-A No. 2013-114668, a driver may have difficulty assessing a current state of his/her own driving operation unless being in a normal state.

It is desirable to provide a vehicle display system and a method of controlling the vehicle display system that both make it possible to optimally control displays for a driver of a vehicle and an outside of the vehicle, depending on whether the driver is in a normal state.

In the following, some non-limiting implementations of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In a technique disclosed in JP-A No. 2013-114668, a safe driving signal that indicates which of safe driving, driving with fatigue, careless driving, and drunk driving corresponds to a driver's driving operation is displayed for a driver of a vehicle. However, the driver may have difficulty assessing his/her own driving operation unless being in a normal state. If a driver's awakening level is lowered, for example, the driver may possibly fail to recognize the display of the safe driving signal. In this situation, it is difficult for the driver to assess his/her own driving operation.

At least one implementation of the technology therefore provides a vehicle display system and a method of controlling the vehicle display system that both make it possible to optimally control displays for a driver of a vehicle and an outside of the vehicle, depending on whether the driver is in a normal state.

FIG. 1 schematically illustrates an example of a configuration of a vehicle system 1000 according to one implementation of the technology. The vehicle system 1000 may be basically mounted in a vehicle. The vehicle may be, for example but not limited to, an automobile. Referring to FIG. 1, the vehicle system 1000 may include vehicle-exterior sensors 100, a driver sensor 200, a seating sensor 300, a controller 400, a HUD device 500, speakers 600, and seat vibrators 700.

Each of the vehicle-exterior sensors 100 may be a stereo camera, a monocular camera, millimeter wave radar, an infrared sensor, or any other sensing device. Each vehicle-exterior sensor 100 may measure a parameter such as, but not limited to, a position and speed of an object. Non-limiting examples of the object may include a vehicle and a person around the vehicle. In an example implementation, each vehicle-exterior sensor 100 may be a stereo camera that includes a pair of right and left cameras each having an imaging device such as, but not limited to, a charge-coupled device (CCD) sensor or a complementary metal-oxide semiconductor (CMOS) sensor. This stereo camera may capture an image of an environment outside the vehicle and transmit information on the captured image to the controller 400. In an example implementation, the stereo camera may be a color camera disposed on an upper portion of a windshield of the vehicle and be able to acquire color information.

The HUD device 500 may be a display device that displays information directly in a human visual field. The HUD device 500 may display a real image on a window such as, but not limited to, the windshield or a rear window of the vehicle. Although a known HUD device typically displays a virtual image, the HUD device 500 in this implementation may be a display device that displays a real image. The HUD device 500 may display a real image at a viewing angle of about 360 degrees, thereby allowing both persons inside and outside the vehicle to view the image. In an alternative implementation, however, the HUD device 500 may display a virtual image.

Figure 2:
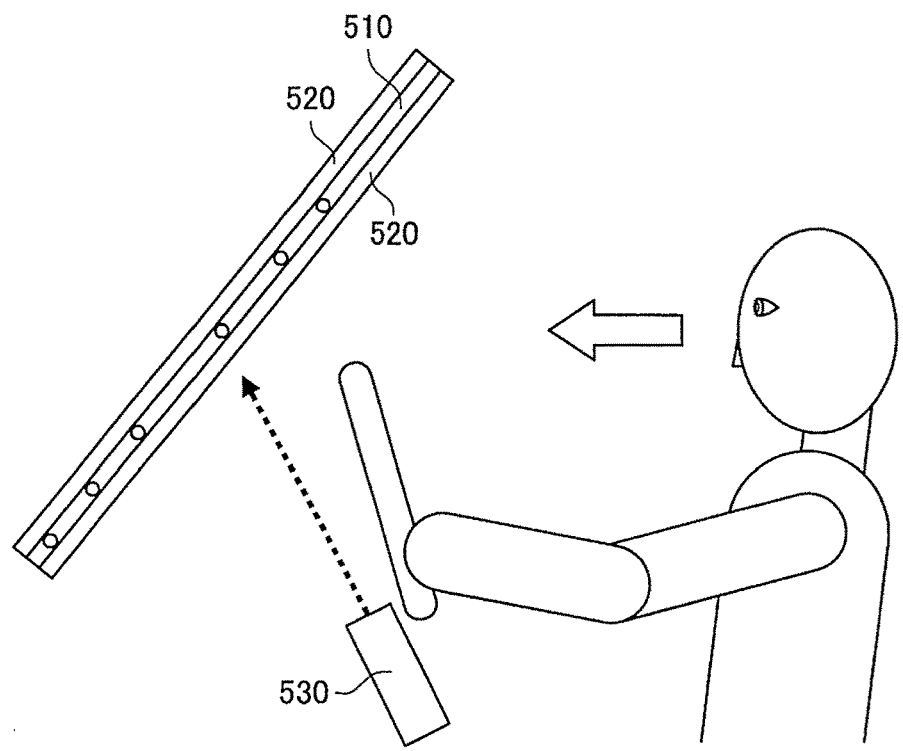
FIG. 2 schematically illustrates an example of a head-up display (HUD) device that includes a self-luminous interlayer film.

In one specific but non-limiting implementation, the HUD device 500 may be a device that includes a self-luminous interlayer film 510, as illustrated in FIG. 2. In such an implementation, the self-luminous interlayer film 510 may be disposed between two sheets of glass 520 in the window of the vehicle such as, but not limited to, the windshield and the rear window. The self-luminous interlayer film 510 may contain a luminescence material. When a portion of the self-luminous interlayer film 510 is irradiated with laser light from a projector 530 mounted in the vehicle, the irradiated portion may emit light, displaying objects, including characters and images. The objects may have visibility at all angles and may be thus viewable not only from the driver seat but also from the other seats as well as any location outside the vehicle. In an alternative implementation, the HUD device 500 may have a configuration in which a self-luminous device is disposed at the window of the vehicle. In such an alternative implementation, the HUD device 500 may have a transparent screen that contains an organic electroluminescence (EL) element, a transmissive liquid crystal device, or any other member that allows for transmissive displaying. In a further alternative implementation, any device other than the HUD device 500 may be used as the display device. In such an alternative implementation, a large-sized liquid crystal display device, a light-emitting diode (LED) display device, or any display device provided on a member such as, but not limited to, an instrument panel may be used as the display device. In the following, a description is given of one implementation in which the HUD device 500 provides a display on the window, such as the windshield and the rear window, of the vehicle. In one implementation, the HUD device 500 may serve as a "display device". The display device according to any implementation of the technology, however, is not limited to the HUD device 500. The term "HUD device" or "display device" according to any implementation of the technology encompasses any and all display devices provided inside and/or outside a vehicle. In an example implementation, the display device may be provided at any external site of the vehicle other than the window, such as a body of the vehicle. In an example implementation, the display device may be provided at any internal site of the vehicle other than the window, such as the instrument panel and a seat. The display devices disposed inside and outside the vehicle may be provided integrally with or separately from each other. Accordingly, the wording "mounted on" the vehicle as used herein and its variants are intended to encompass both an implementation in which the display device is located inside the vehicle and an implementation in which the display device is located outside the vehicle.

The driver sensor 200 may be implemented by a camera, a line-of-sight sensor, a motion sensor, or any other sensing device. This driver sensor 200 may measure movements of the driver's arms and head, a direction of his/her line of sight, and any other parameters related to the driver. In an example implementation where the driver sensor 200 is a camera, the driver sensor 200 may acquire the movements of the arms and head, the direction of the line of sight, and any other parameters by subjecting an image captured by the camera to image processing. In another example implementation where the driver sensor 200 is a line-of-sight sensor, the driver sensor 200 may detect the line of sight by using a corneal reflection method or any other similar method. The seating sensors 300 may be provided in the respective seats of the vehicle, and each of the seating sensors 300 may determine whether a person sits on a corresponding seat. The speakers 600 may emit a warning sound toward the inside and outside of the vehicle when the HUD device 500 displays a warning to persons inside and outside of the vehicle. The seat vibrators 700 may be provided in the respective seats inside the vehicle. In addition, the seat vibrators 700 may vibrate the seats to give a warning to the driver and occupants when the HUD device 500 displays a warning inside the vehicle.

The controller 400 may control the displaying of the HUD device 500 on the basis of the information detected by the vehicle-exterior sensors 100, the driver sensor 200, and other sensors. The controller 400 may include an environment information acquiring unit 402, a driver information acquiring unit 404, a driver state determiner 406, an environment state determiner 407, a seating state determiner 408, a distance determiner 410, a driver recognition determiner 412, and a HUD controller 414. In one implementation, the seating state determiner 408 may serve as an "occupant determiner". In one implementation, the HUD controller 414 may serve as a "display controller". In one implementation, the environment state determiner 407 may serve as a "determiner". Each of the components of the controller 400 may be implemented in hardware or in software. In an example implementation where one component of the controller 400 is implemented in hardware, this component may be circuitry. In another example implementation where one component of the controller 400 is implemented in software, this component may be a program that causes a central processing unit (CPU) or other processor to perform its function.

The environment information acquiring unit 402 may acquire information on a distance to a target, namely, a subject in this case. This information may be called distance information. In an example implementation, the environment information acquiring unit 402 may generate the distance information, on the basis of an amount of shift between corresponding locations in a pair of right and left stereo images and by means of principle of triangulation. The pair of right and left stereo images may be captured by a set of right and left cameras of the stereo camera which constitutes each vehicle-exterior sensor 100 in one implementation. Together with the acquisition of the distance information, the environment information acquiring unit 402 may also acquire information on a location of the subject from the information on the images captured by the set of right and left cameras of the stereo camera which constitutes each vehicle-exterior sensor 100. This information may be called image information. Further, the environment information acquiring unit 402 may perform a known grouping process on the distance information generated by the principle of triangulation. Then, the environment information acquiring unit 402 may obtain data on a three-dimensional object, a lane line, and other objects by comparing the distance information subjected to the grouping process with preset three-dimensional data such as, but not limited to, three-dimensional object data. By performing the processes in this manner, the controller 400 is able to recognize various entities, including a person, another vehicle, a stop sign, a stop line, and an electronic toll collection (ETC) gate.

On the basis of the information on the distance to a factor generated by the principle of triangulation, the environment information acquiring unit 402 may also calculate a variation in the distance to the factor and/or a speed relative to the factor. Non-limiting examples of the factor may include a person and another vehicle. The variation in the distance may be determined by integrating distances to the factor in frame images. The frame images may be acquired at regular time intervals. The relative speed may be determined by dividing the distances acquired at regular time intervals by the unit time.

In the above manner, the environment information acquiring unit 402 may acquire the image information regarding an environment outside the vehicle, from the vehicle-exterior sensors 100. In addition, the environment information acquiring unit 402 may analyze the acquired image information through an image analyzing process. As a result of analyzing the image information, the environment information acquiring unit 402 may acquire environment information regarding the environment outside the vehicle.

Figure 3:
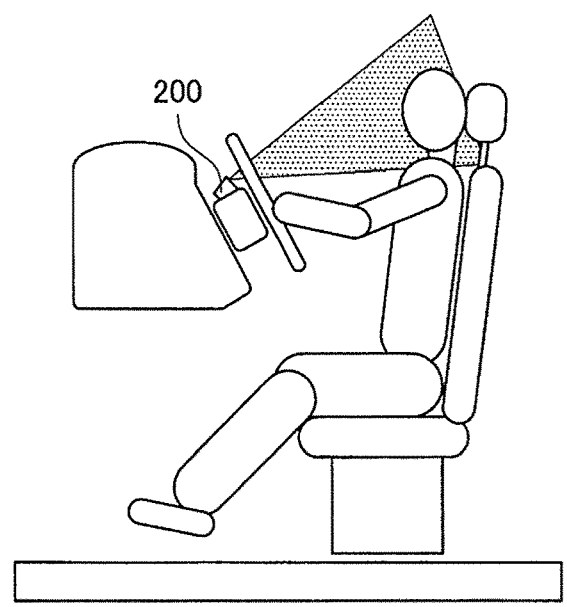
FIG. 3 schematically illustrates an example of a state where a driver sensor captures an image of a driver of a vehicle.

FIG. 3 schematically illustrates an example of a state where the driver sensor 200 captures an image of the driver if the driver sensor 200 is implemented by a camera. As illustrated in FIG. 3, as an example, the driver sensor 200 may be mounted on an upper portion of a steering column.

In an example implementation where the driver sensor 200 is a camera, the image captured by the driver sensor 200 may be supplied to the controller 400. Then, the driver information acquiring unit 404 may acquire a face region of the driver from the received image through an image processing technique such as, but not limited to, an edge and face detection technique. The driver information acquiring unit 404 thereby may acquire an orientation of the face on the basis of the face region. The driver state determiner 406 may determine whether the driver looks aside, on the basis of the face orientation. Moreover, the driver information acquiring unit 404 may obtain information on locations of feature points of predetermined parts of the face, which is called location information. Non-limiting examples of the predetermined parts of the face may include the eyes, the nose, and the mouth. On the basis of this location information, then, the driver state determiner 406 may determine a state of the driver. In an example implementation, the driver state determiner 406 may determine a possibility that the driver looks ahead without due care because of drowsiness or sleeping, for example.

Figure 4:
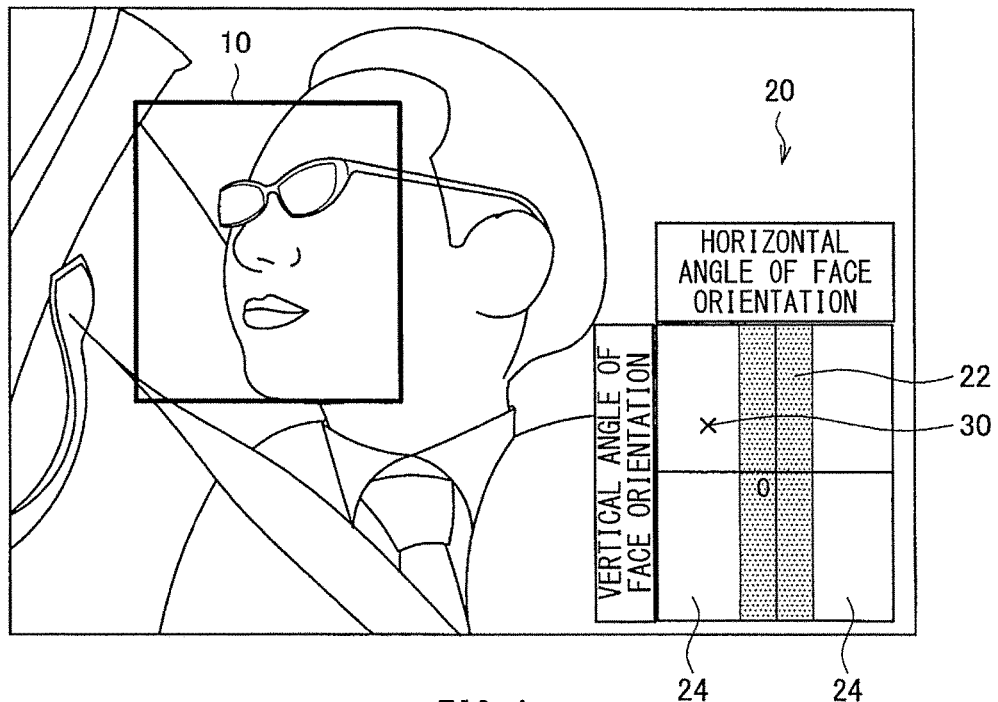
FIG. 4 schematically illustrates an example of a manner in which an angle at which a driver's face is oriented and other face-related factors are calculated on the basis of a face region of the driver.

FIG. 4 schematically illustrates an example of a manner in which an angle at which a face is oriented and other face-related factors are calculated on the basis of a face region 10 of the driver which has been detected. On the basis of the face region 10 of the driver which has been acquired from the image information, the driver state determiner 406 may monitor whether the face orientation of the driver falls outside a predetermined region, thereby making it possible to determine a possibility that the driver looks aside. In such an implementation, the face region 10 of the driver may be defined from the location information on the feature points of the parts, including the eyes, the nose, and the mouth, of the face. In order to estimate the face orientation, as an example, the driver state determiner 406 may use, as a reference, a distance between the eyes as seen from the front and then may compare this reference with a distance between the eyes obtained from the image information. It may be determined that, as the distance between the eyes obtained from the image information becomes smaller than the reference, the face is oriented sideways more largely as seen from the front.

FIG. 4 illustrates a detection result 20 at its lower right. In the detection result 20, the vertical axis represents "vertical angle of face orientation", the horizontal axis represents "horizontal angle of face orientation", and an X-mark 30 denotes "detected angles of face orientation". In the detection result 20, a shaded, rectangular area at the center may be a front region 22. If detected angles of the face orientation fall within the front region 22, the controller 400 may determine that the driver looks ahead. If the detected angles are shifted from within the front region 22 to within one of right and left side regions 24, as indicated by the X-mark 30, the controller 400 may determine that there is a possibility that the driver looks aside. Thresholds used to differentiate the front region 22 and right and left side regions 24 from one another may be varied as appropriate. In one example implementation, the thresholds may be set to about −20 degrees and +20 degrees in the horizontal direction. In one example implementation, whether the driver looks aside may be determined in the following manner. First, a ratio of a period over which the angles of the face orientation stay within one of the right and left side regions 24 to a reference period may be calculated. Then, if the calculated ratio exceeds a predetermined threshold, it may be determined that the driver looks aside. In an alternative example implementation, if the angles of the face orientation continue to fall outside a predetermined range over a predetermined period or if the driver sensor 200 successively fails to detect the driver's face over a predetermined period, the driver state determiner 406 may determine that the driver looks aside.

Figure 5:
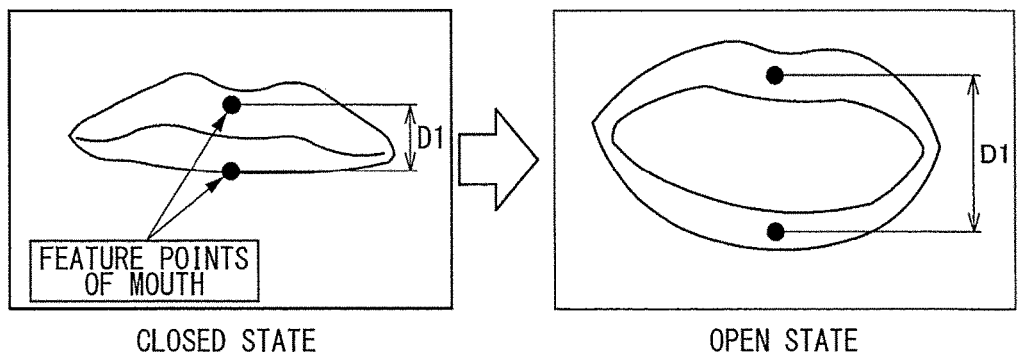
FIG. 5 schematically illustrates a mouth opening detection for use in determining whether the driver opens his/her mouth.

FIG. 5 schematically illustrates a mouth opening detection for use in determining whether the driver opens his/her mouth. As illustrated in FIG. 5, whether the driver opens the mouth may be determined on the basis of a distance D1 between the feature points of the upper and lower parts of the mouth. If the distance D1 exceeds a predetermined value, for example, as illustrated in the right part of FIG. 5 which illustrates a mouth-opened state, it may be determined there is possibility that the driver opens the mouth and yawns. In one example implementation, if a state where the driver continues to open the mouth over a predetermined period is detected a preset number of times, it may be determined that there is an increasing possibility that the driver sleeps.

Figure 6:
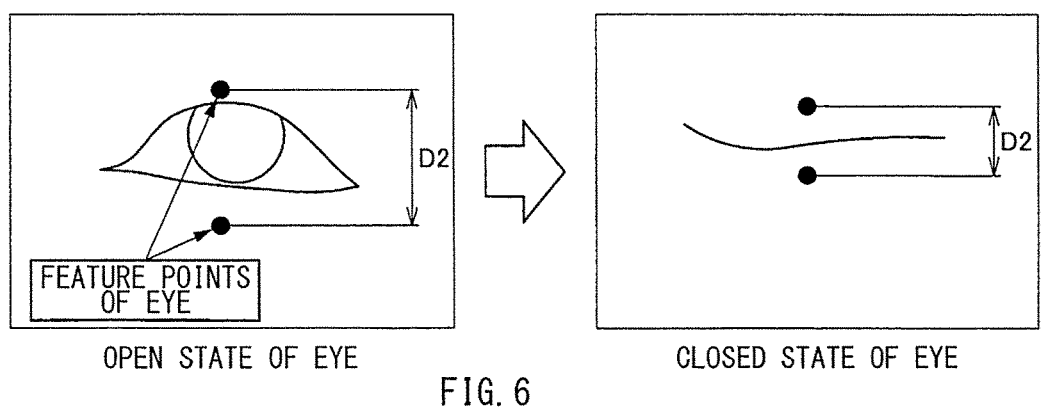
FIG. 6 schematically illustrates an example of a manner in which whether the driver closes his/her eyes is determined.

FIG. 6 schematically illustrates an example of a manner in which whether the driver closes his/her eyes is determined. As illustrated in FIG. 6, it may be detected whether the driver closes the eyes, from a distance D2 between feature points of upper and lower parts of any of the eyes. If the distance D2 is equal to or less than a predetermined value, for example, as illustrated in the right part of FIG. 6 which illustrates an eye-closed state, it may be determined that there is a possibility that the driver sleeps. In one example implementation, whether the driver sleeps may be determined in the following manner. First, an eye closure ratio, which is a ratio of a period over which the driver continues to close the eyes to a reference period may be calculated. Then, if the calculated eye closure ratio exceeds a predetermined threshold, it may be determined that the driver sleeps. In another example implementation, if a state where driver closes the eyes is detected a predetermined number of times within a preset period, it may be determined that there is an increasing possibility that the driver sleeps. In further another example implementation, blinks may be detected through image processing. Then, on the basis of the frequency of the blinks, whether the driver sleeps may be determined. These determinations, as illustrated in FIGS. 5 and 6, may be made by the driver state determiner 406.

The environment state determiner 407 in the controller 400 may determine a state of an environment outside the vehicle, on the basis of the environment information acquired by the environment information acquiring unit 402. The environment state determiner 407 may set a target to a person outside the vehicle and determine a state of this target.

The seating state determiner 408 may determine whether an occupant sits on each seat inside the vehicle, on the basis of information acquired from the seating sensor 300. The distance determiner 410 may determine whether a distance between the vehicle and the target outside the vehicle is equal to or shorter than a predetermined distance, on the basis of the distance information acquired by the environment information acquiring unit 402. The driver recognition determiner 412 may determine whether the driver is aware of the target, on the basis of the position of the target outside the vehicle which has been acquired by the environment information acquiring unit 402 and the face orientation or line of sight of the driver which has been acquired by the driver information acquiring unit 404. The HUD controller 414 may control displaying of the HUD device 500. In an example implementation, the HUD controller 414 may control the displaying of the HUD device 500 on the basis of the determination results of the driver state determiner 406, the environment state determiner 407, the seating state determiner 408, the distance determiner 410, and the driver recognition determiner 412.

In one implementation, when the vehicle-exterior sensor 100 detects presence of a person, vehicle, and other obstacle around the vehicle, the HUD device 500 may display a warning to the driver. In an example implementation where the vehicle-exterior sensor 100 detects the presence of a person, vehicle, or other obstacle in front of the vehicle during the running of the vehicle, the HUD device 500 may display a warning display, thereby giving a warning to the driver. In addition, the HUD device 500 may also provide the warning display to the person, vehicle, or obstacle outside the vehicle, because the warning display is recognizable from the outside of the vehicle as well. In such an implementation, the driver information acquiring unit 404 may acquire information on the driver from the driver sensor 200. Then, the driver state determiner 406 may determine whether the driver is in a normal state. On the basis of a result of this determination, the HUD controller 414 may control the displaying of the HUD device 500.

To determine whether the driver is in a normal state, the driver state determiner 406 may determine an awakening level of the driver, on the basis of a result of the determination whether the driver looks aside and/or whether the driver looks ahead without due care because of drowsiness or sleeping, for example. In accordance with the awakening level of the driver, the HUD controller 414 may optimally control the displaying of the HUD device 500. In one example implementation, the determination of the awakening level may be made on the basis of a drowsiness level or a health problem associated with a disease.

Figure 7:
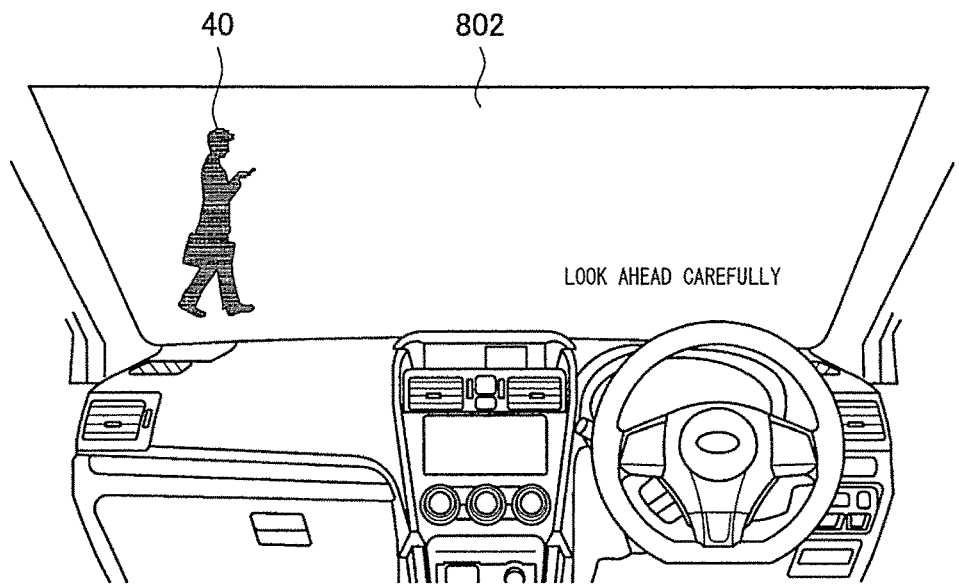
FIG. 7 schematically illustrates an example of a display for the driver inside the vehicle.

FIG. 7 schematically illustrates an example of a display for the driver inside the vehicle. The driver state determiner 406 may determine a state of the driver by using the driver sensor 200. When the driver state determiner 406 determines that the driver is in a normal state, the HUD device 500 may provide the display for the driver. In an example implementation, as illustrated in FIG. 7, the HUD device 500 may display a warning message saying "LOOK AHEAD CAREFULLY" on a windshield 802 of the vehicle in front of the driver.

Figure 8:
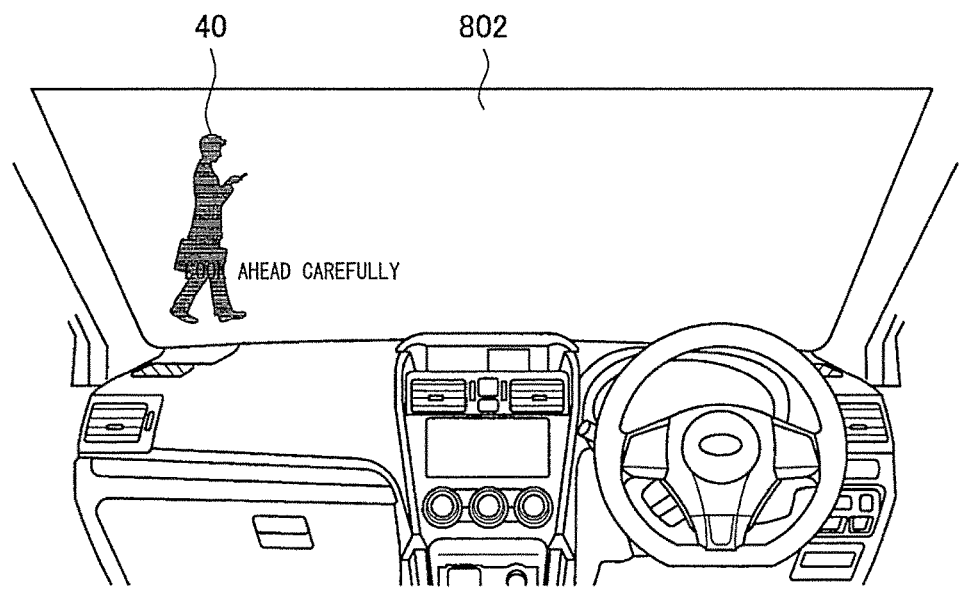
FIG. 8 schematically illustrates an example of a display for an occupant on a front passenger seat inside the vehicle.

FIG. 8 schematically illustrates an example of a display for an occupant on a front passenger seat inside the vehicle. When the driver state determiner 406 determines that the driver is not in a normal state, the HUD device 500 may provide displays for the occupant and the outside of the vehicle. In an example implementation, as illustrated in FIG. 8, the HUD device 500 may provide a warning display for the occupant on the windshield 802. As a result, the occupant on the front passenger seat is expected to take an appropriate action when the driver is not in a normal state.

Figure 9:
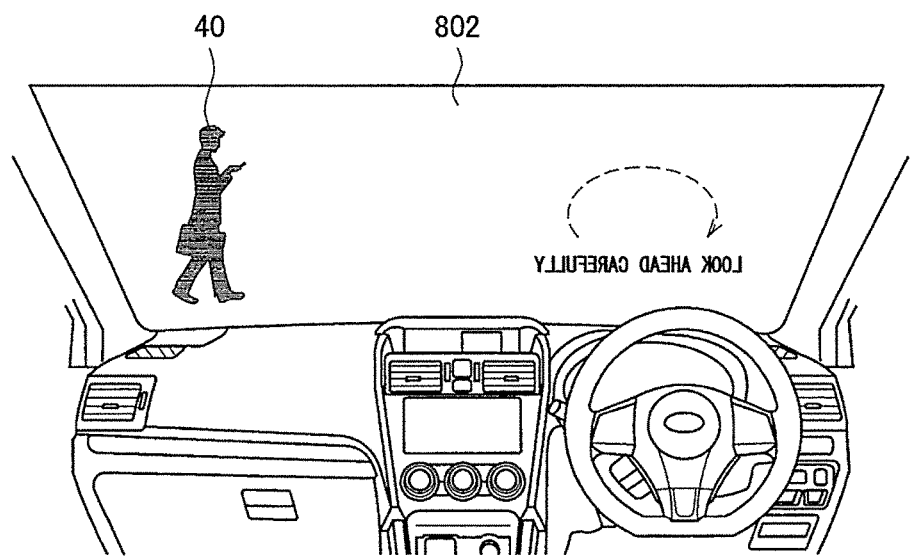
FIG. 9 schematically illustrates an example of a display for an outside of the vehicle.
Figure 10:
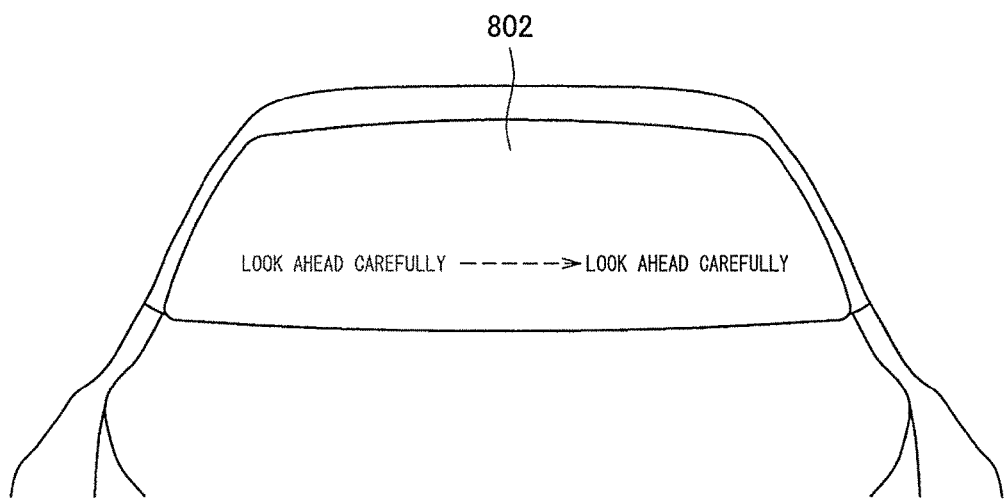
FIG. 10 schematically illustrates an example of movement of the display of FIG. 9 to a site where a target is able to view more easily.

FIG. 9 schematically illustrates an example of a display for the outside of the vehicle. When the driver is not in a normal state, the HUD device 500 may provide, on the windshield 802, a warning display for the outside of the vehicle, as illustrated in FIG. 9. This warning display may be the reverse of the warning display of FIG. 7. In this way, the HUD device 500 gives a warning to a person 40, who is a target outside the vehicle. It is to be noted that the display in FIG. 9 which is intended for the outside of the vehicle may be identical to the display in FIG. 7 except their orientations; however, both the displays may be different from each other. In one specific but non-limiting implementation, the display in FIG. 9 may be a message saying "VEHICLE COMING CLOSER!". FIG. 10 schematically illustrates an example of movement of the display of FIG. 9 to a site where the target is able to view more easily.

When the driver recognition determiner 412 determines that the driver becomes aware of the person 40 outside the vehicle after the HUD device 500 has provided the display of FIG. 7 for the driver, the HUD device 500 may switch the display to provide the display for the outside of the vehicle, as illustrated in FIG. 9. For example, the HUD device 500 may clear the display and, in turn, provide the display for the outside of the vehicle. One reason is that it is no longer necessary to give a warning to the driver.

Figure 11:
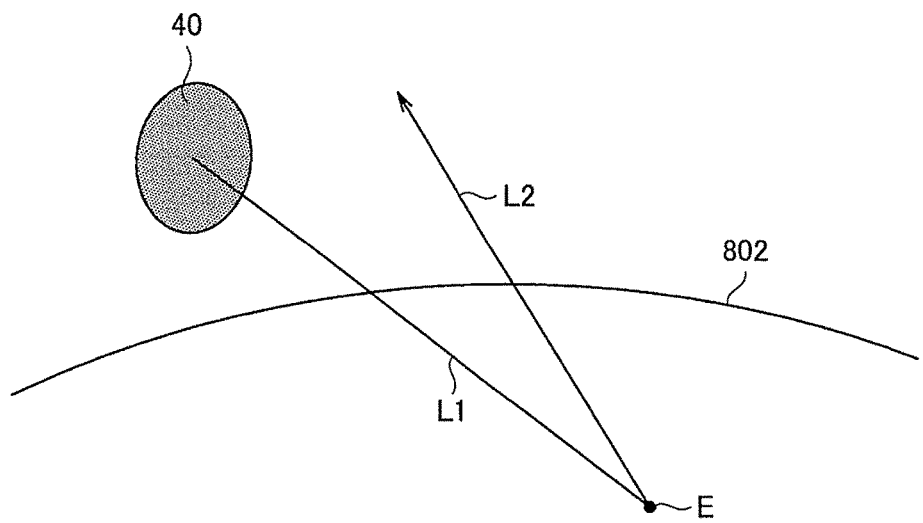
FIG. 11 schematically illustrates an example of a method of determining whether the driver is aware of a person outside the vehicle.

FIG. 11 schematically illustrates an example of a method of determining whether the driver is aware of the person 40 outside the vehicle. Further, FIG. 11 illustrates the windshield 802 as viewed from the top of the vehicle. In other words, FIG. 11 illustrates a cross section of the windshield 802 taken along a horizontal plane at any given height. As illustrated in FIG. 11, when the vehicle-exterior sensors 100 detect the person 40 outside the vehicle, the driver recognition determiner 412 may determine a straight line L1 by which an eye point E of the driver is connected to the person 40. When the driver information acquiring unit 404 acquires the face orientation or direction to the line of sight of the driver, the driver recognition determiner 412 may determine a straight line L2 indicating the face orientation or direction to the line of sight. When the straight line L1 substantially coincides with the straight line L2 or when the straight line L2 is contained in a preset angle range that the straight line L1 traverses at its center, the driver recognition determiner 412 may determine that the driver is aware of the person 40 outside the vehicle. In an example implementation, a default value of the eye point E of the driver may be an average value of an eye location of the driver. In an example implementation where the driver sensor 200 is implemented by a stereo camera, the eye point E of the driver may be acquired by means of principle of triangulation.

Figure 12:
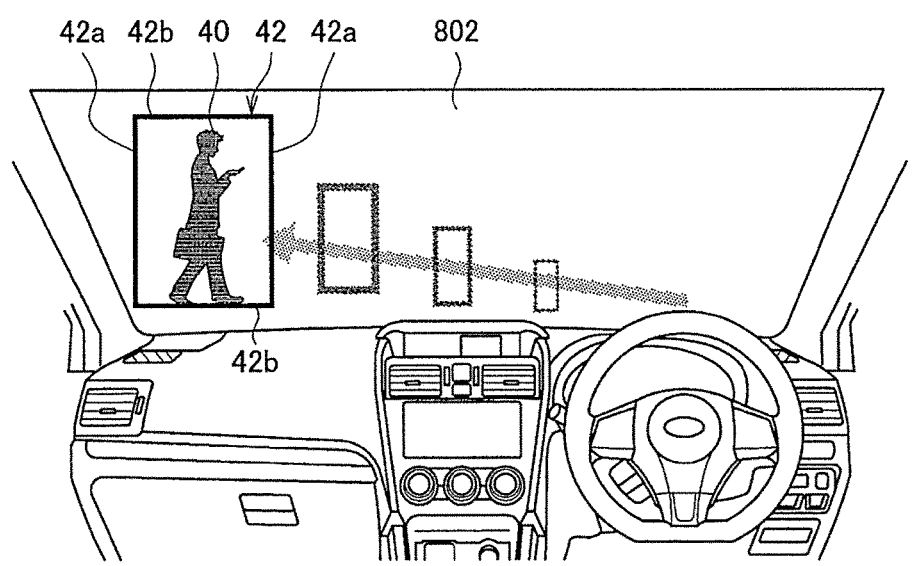
FIG. 12 schematically illustrates an example of a display on a windshield in which a frame is displayed at a position overlapped with the person outside the vehicle.

FIG. 12 schematically illustrates an example of a display on the windshield 802 in which a frame 42 is displayed at a position overlapped with the person 40 outside the vehicle. When the driver has not been aware of person 40 over a preset period since the provision of the display of FIG. 7 for the driver, the HUD device 500 may provide the display illustrated in FIG. 12. Displaying the frame 42 around the person 40 outside the vehicle in an overlapped fashion helps the driver become aware of the person 40.

Figure 13:
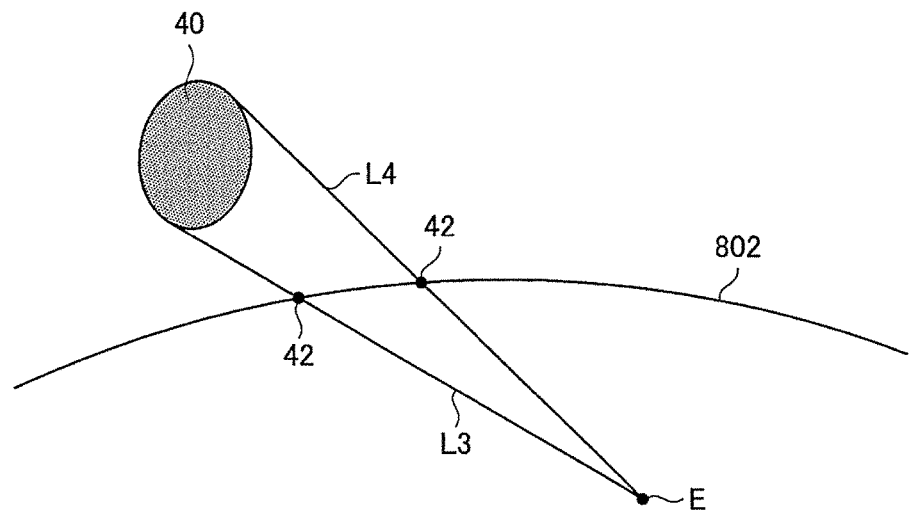
FIG. 13 schematically illustrates an example of a method of displaying the frame on the windshield at the position overlapped with the person outside the vehicle.

FIG. 13 schematically illustrates an example of a method of displaying the frame 42 on the windshield 802 at the position overlapped with the person 40 outside the vehicle. Further, FIG. 13 illustrates the windshield 802 as viewed from the top of the vehicle, similar to FIG. 11. In other words, FIG. 13 illustrates a cross section of the windshield 802 taken along a horizontal plane at any given height. When the vehicle-exterior sensors 100 detect the person 40 outside the vehicle, the driver recognition determiner 412 may determine straight lines L3 and L4 by each of which the eye point E of the driver is connected to an outline of the person 40. Then, the driver recognition determiner 412 may determine intersection points of the windshield 802 and the straight lines L3 and L4 and may set long sides 42a of the frame 42 illustrated in FIG. 12 at respective locations of the intersection points. The driver recognition determiner 412 may also set short sides 42b of the frame 42 in a similar manner.

Figure 14:
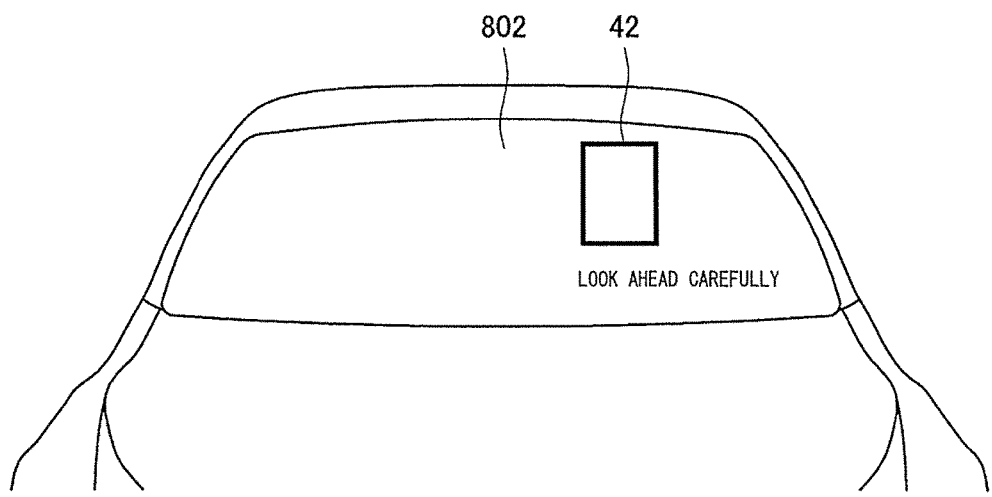
FIG. 14 schematically illustrates an example of the display illustrated in FIG. 10 for the outside of the vehicle in addition to the display of FIG. 12.

FIG. 14 schematically illustrates an example of the display illustrated in FIG. 10 for the outside of the vehicle in addition to the display of FIG. 12. When a distance from the vehicle to the person 40 is equal to or less than a preset threshold (L [m]), the HUD device 500 may provide both the display of FIG. 12 and the overlapped display for the outside of the vehicle at the same time, thereby giving a warning to the person 40 outside the vehicle.

Figure 15:
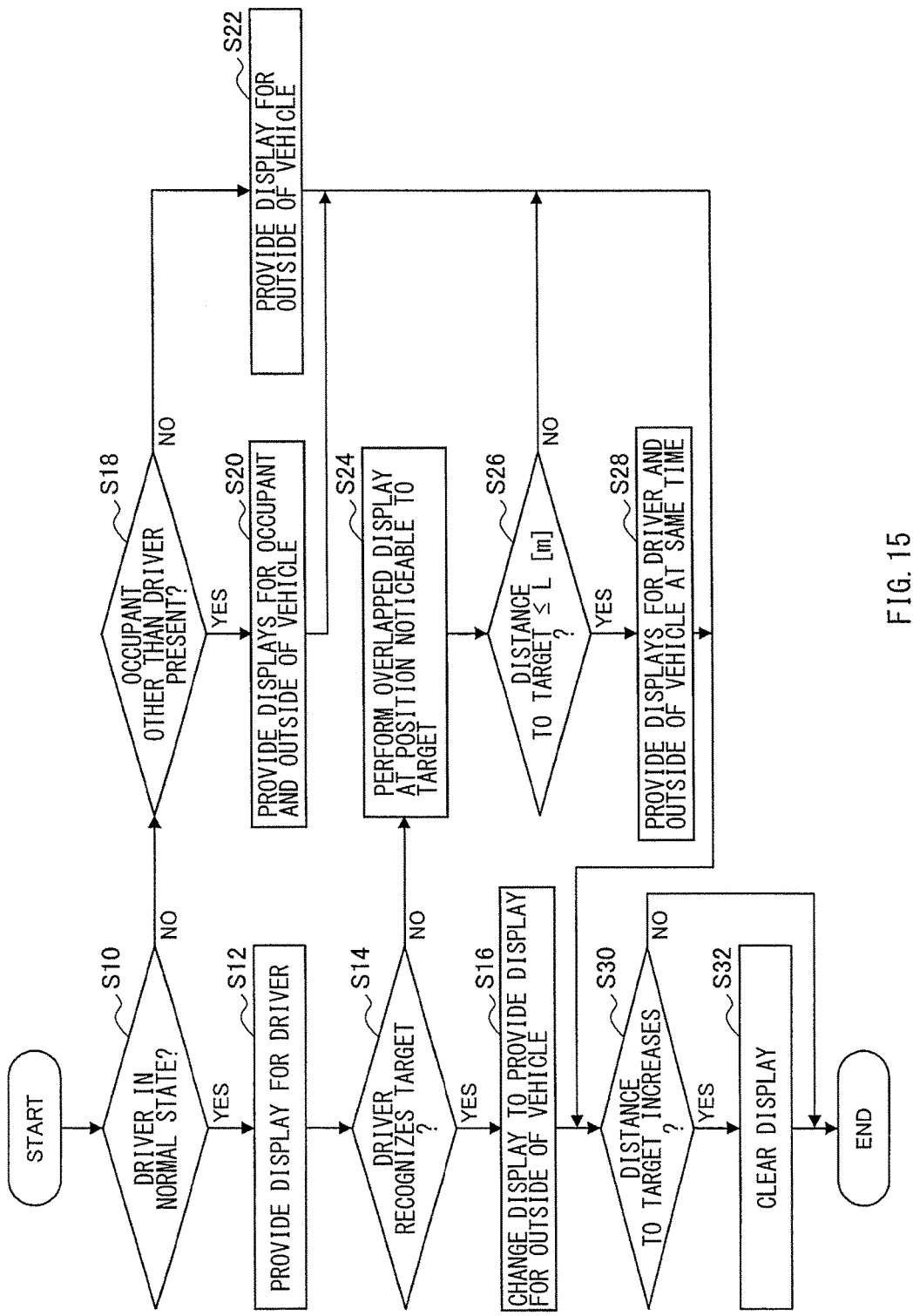
FIG. 15 is a flowchart of an example of a process performed by the vehicle display system according to one implementation.

Next, a description is given of an example of a process performed by the vehicle system 1000 according to one implementation, with reference to a flowchart of FIG. 15. The process of FIG. 15 may be performed by the components of the controller 400 and may be repeated during predetermined control periods. In step S10, the driver information acquiring unit 404 may acquire the information on the driver, and the driver state determiner 406 may determine whether the driver is in a normal state. When the driver state determiner 406 determines that the driver is in a normal state (S10: YES), the flow may proceed to step S12. In step S12, the HUD controller 414 may control the displaying of the HUD device 500 to provide the display for the driver, as illustrated in FIG. 7.

After the step S12 has been performed, the flow may proceed to step S14. In step S14, the driver recognition determiner 412 may use the method illustrated in FIG. 11 to determine whether the driver recognizes the person 40 outside the vehicle. When the driver recognition determiner 412 determines that the driver recognizes the person 40 (S14: YES), the flow may proceed to step S16. In step S16, the HUD controller 414 may control the displaying of the HUD device 500 to change the display so that the display is switched to provide the display for the outside of the vehicle, as illustrated in FIG. 9. For example, in step S16, the HUD controller 414 may control the displaying of the HUD device 500 to clear the display and, in turn, to provide the display for the outside of the vehicle.

When the driver state determiner 406 determines that the driver is not in a normal state at step S10 (S10: NO), the flow may proceed to step S18. In step S18, the seating state determiner 408 may determine whether an occupant other than the driver is present, on the basis of the information acquired from the seating sensors 300. When the seating state determiner 408 determines that the occupant other than the driver is present (S18: YES), the flow may proceed to step S20. In step S20, the HUD controller 414 may control the displaying of the HUD device 500 to provide the displays for the occupant and the outside of the vehicle. In an example implementation, the displays illustrated in FIGS. 8 and 9 may be provided. It is to be noted that the displays illustrated in FIGS. 8 and 9 may be provided either at the same time or alternately at fixed time intervals.

When the seating state determiner 408 determines that an occupant other than the driver is not present at step S18 (S18: NO), the flow may proceed to step S22. At step S22, the HUD controller 414 may control the displaying of the HUD device 500 to provide the display for the outside of the vehicle, as illustrated in FIG. 9.

When the driver recognition determiner 412 determines that the driver does not recognize the person 40 (S14: NO), the flow may proceed to step S24. In step S24, the HUD controller 414 may control the displaying of the HUD device 500 to further display the frame 42 in the overlapped fashion, thereby helping the driver become aware of the person 40. The display illustrated in FIG. 12 is thereby provided.

After step S24 has been performed, the flow may proceed to step S26. In step S26, the distance determiner 410 may determine whether a distance to the target is equal to or less than the preset threshold L [m]. When the distance determiner 410 determines that the distance to the target is equal to or less than the preset threshold L [m] (S26: YES), the flow may proceed to step S28. In step S28, the HUD controller 414 may control the displaying of the HUD device 500 to provide the display of FIG. 12 and the display for the outside of the vehicle at the same time, as illustrated in FIG. 14.

After step S16, S22, or S28 has been performed, the flow may proceed to step S30. In addition, when the distance determiner 410 determines that the distance to the target exceeds the preset threshold L [m] at step S26 (S26: NO), the flow may also proceed to step S30. In step S30, the distance determiner 410 may determine whether the distance to the target increases until the distance becomes equal to or greater than a preset value. When the distance determiner 410 determines that the distance to the target is equal to or greater than the preset value (S30: YES), it is no longer necessary to give a warning and the flow may proceed to step S32 accordingly. In step S32, the HUD controller 414 may cause the HUD device 500 to clear the display(s) on the windshield 802 and conclude the process in the current control period (END). When the distance determiner 410 determines that the distance to the target is less than the preset value at step S30 (S30: NO), the HUD controller 414 may conclude the process in the current control period while causing the HUD device 500 to maintain the display(s) (END).

In one implementation, as described above, the HUD controller 414 may control the displaying of the HUD device 500 in accordance with the states of the driver and the occupant. In an alternative implementation, the HUD controller 414 may control the displaying of the HUD device 500 in accordance with the states of the driver and the target outside the vehicle. In such an implementation, the driver state determiner 406 may determine the state of the driver in a manner similar to the way described above and on the basis of the information acquired from the driver sensor 200. Furthermore, the environment state determiner 407 may determine the state of the target (or the person) outside the vehicle on the basis of the information acquired from the vehicle-exterior sensor 100. It is to be noted that the determination whether the target person is in a normal state may be made in a manner similar to the method of determining the state of the driver.

The controller 400 may control the displaying of the HUD device 500 to switch between the display for the driver and the display for the target outside the vehicle, depending on whether each of the driver and the target is in a normal state. In an example implementation where the driver is not in a normal state but the target outside the vehicle is in a normal state, the HUD controller 414 may control the displaying of the HUD device 500 to provide the display for the target outside the vehicle. In another example implementation where the driver is in a normal state but the target outside the vehicle is not in a normal state, the HUD controller 414 may control the displaying of the HUD device 500 to provide the display for the driver.

When, as a result of determining whether the driver is aware of the target, the driver recognition determiner 412 determines that he/she is not aware of the target, the HUD controller 414 may control the displaying of the HUD device 500 to provide the display for the inside of the vehicle, thereby giving the driver a warning of an approach of the target to the vehicle. In such an implementation, the HUD device 500 may display the frame 42 around the target in the overlapped fashion, as illustrated in FIG. 12. When the driver recognition determiner 412 determines that the driver becomes aware of the target, the HUD device 500 may switch the display to provide the display for the outside the vehicle. For example, when the driver recognition determiner 412 determines that the driver becomes aware of the target, the HUD device 500 may clear the display and, in turn, provide the display for the target.

The controller 400 may use a method similar to the determination method performed by the driver recognition determiner 412 to determine whether the target outside the vehicle is aware of the vehicle. When the controller 400 determines that the target is not aware of the vehicle, the HUD device 500 may provide the display for the outside of the vehicle, thereby giving the target a warning of an approach of the vehicle. When the controller 400 determines that the target is aware of the vehicle, the HUD device 500 may switch the display to provide the display for the driver. For example, when the controller 400 determines that the target is aware of the vehicle, the HUD device 500 may clear the display and, in turn, provide the display for the driver.

According to one implementation described above, the vehicle system 1000 is able to optimally control displays for the driver of the vehicle and the outside of the vehicle, depending on whether the driver is in a normal state. In other words, the vehicle system 1000 optimally controls displays for the inside and outside of the vehicle which are provided by the HUD device 500, in accordance with the state of the driver. When determining that the driver is in a normal state, the vehicle system 1000 provides the display for the driver inside the vehicle. When determining that the driver is not in a normal state, the vehicle system 1000 provides the display for the outside of the vehicle. Consequently, when the driver is not in a normal state, such as but not limited to when he/she looks aside or sleeps, the vehicle system 1000 switches the display to provide the display for the outside of the vehicle, thereby making it possible to give a warning to the outside of the vehicle.

The controller 400 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 400 illustrated in FIG. 1.

Although some implementations of the technology have been described in the foregoing with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle display system comprising:
a display device configured to display an image on a window of a vehicle;
a controller configured to:
determine whether a driver of the vehicle is in a normal state;
responsive to determining that the driver is in the normal state:
provide for display, on the display device, a first image towards inside the vehicle for the driver;
acquire, from one or more sensors, information of an environment outside the vehicle, wherein the information of the environment indicates that a target is present outside the vehicle;
determine whether the driver is aware of the presence of the target outside the vehicle; and
responsive to determining that the driver is aware of the presence of the target, provide for display, on the display device, a second image for the target outside the vehicle;
responsive to determining that the driver is not in the normal state:
provide for display, on the display device, a third image towards outside the vehicle; and
provide for display, on the display device concurrently with the second image, a fourth image towards inside the vehicle for an occupant present inside the vehicle based on determining that the occupant other than the driver is present inside the vehicle.

2. The vehicle display system according to claim 1, wherein responsive to determining that the driver is not aware of the presence of the target outside the vehicle, the controller displays, on the display device, a fifth image so that the fifth image on the display device overlaps the target outside the vehicle when viewed by the driver through the window of the vehicle.

3. The vehicle display system according to claim 2, wherein the fifth image is a frame that surrounds the target when viewed by the driver through the window of the vehicle.

4. The vehicle display system according to claim 2, wherein the controller determines, using the one or more sensors, a distance from the vehicle to the target outside the vehicle, and
wherein the controller displays, on the display device, the fifth image when the distance is equal to or less than a preset value.

5. The vehicle display system according to claim 1, further comprising a vehicle-exterior sensor configured to perform detection of a state of the outside of the vehicle, wherein
the controller acquires the information on the environment from the vehicle-exterior sensor.

6. The vehicle display system according to claim 5, wherein the vehicle-exterior sensor comprises a stereo camera.

7. The vehicle display system according to claim 1, further comprising:
a camera configured to capture an image of the driver, wherein the controller determines whether the driver is in the normal state based on the image of the driver.

8. The vehicle display system according to claim 7, wherein the controller determines, based on the image of the driver, an awakening level of the driver is in the normal state.

9. A method of controlling a vehicle display system, the method comprising:
determining whether a driver of a vehicle is in a normal state;
displaying, on a window of the vehicle, a first image for inside the vehicle based on determining that the driver is in the normal state;
displaying, on the window of the vehicle, a second image for a target outside the vehicle based on determining that 1) the driver is in the normal state and 2) the driver is aware of a presence of the target outside the vehicle;
displaying, on the window of the vehicle, a third image for outside the vehicle based on determining that the driver is not in the normal state;
displaying, on the window of the vehicle concurrently with the third image, a fourth image for an occupant present inside the vehicle based on determining that the occupant other than the driver is present inside the vehicle.

10. A vehicle display system comprising:
a display device configured to display an image on a window of a vehicle;
a controller configured to:
provide for display, on the display device, the image with a first display orientation so that the image is displayed towards inside the vehicle;
acquire, from one or more sensors, information of an environment outside the vehicle, the information of the environment indicates that a target is present outside the vehicle; and
switch a display orientation of the image from the first display orientation to a second display orientation so that the image is displayed only towards outside the vehicle based on determining that a driver is aware of the presence of the target.

11. A method of controlling a vehicle display system, the method comprising:
displaying, on a window of a vehicle, an image with a first display orientation so that the image is displayed towards inside the vehicle;
acquiring, from one or more sensors, information of an environment outside the vehicle, the information of the environment indicates that a target is present outside the vehicle; and
switching a display orientation of the image from the first display orientation to a second display orientation so that the image is displayed only towards outside the vehicle based on determining that a driver is aware of the presence of the target.

12. A vehicle display system comprising:
a display device configured to display an image on a window of a vehicle; and
circuitry configured to
determine whether a driver of a vehicle is in a normal state;
provide for display, on the display device, a first image for inside the vehicle based on determining that the driver is in the normal state;
provide for display, on the display device, a second image for a target outside the vehicle based on determining that 1) the driver is in the normal state and 2) the driver is aware of a presence of the target outside the vehicle;
provide for display, on the display device, a third image for outside the vehicle based on determining that the driver is not in the normal state;
provide for display, on the display device concurrently with the third image, a fourth image for an occupant present inside the vehicle based on determining that the occupant other than the driver is present inside the vehicle.

13. A vehicle display system comprising:
a display device configured to display an image on a window of a vehicle; and
circuitry configured to
provide for display, on the display device, the image with a first display orientation so that the image is displayed towards inside the vehicle;
acquire, from one or more sensors, information of an environment outside the vehicle, the information of the environment indicates that a target is present outside the vehicle; and
switch a display orientation of the image from the first display orientation to a second display orientation so that the image is displayed only towards outside the vehicle based on determining that a driver is aware of the presence of the target.

* * * * *